United States Patent
Chien et al.

(10) Patent No.: US 11,954,779 B2
(45) Date of Patent: Apr. 9, 2024

(54) ANIMATION GENERATION METHOD FOR TRACKING FACIAL EXPRESSION AND NEURAL NETWORK TRAINING METHOD THEREOF

(71) Applicant: Digital Domain Enterprises Group Limited, Central (HK)

(72) Inventors: Chin-Yu Chien, Central (HK); Yu-Hsien Li, Central (HK); Yi-Chi Cheng, Central (HK)

(73) Assignee: DIGITAL DOMAIN ENTERPRISES GROUP LIMITED, Hong Kong (CN)

( * ) Notice: Subject to any disclaimer, the term of this patent is extended or adjusted under 35 U.S.C. 154(b) by 0 days.

(21) Appl. No.: 17/689,495

(22) Filed: Mar. 8, 2022

(65) Prior Publication Data

US 2022/0292753 A1    Sep. 15, 2022

Related U.S. Application Data

(60) Provisional application No. 63/158,384, filed on Mar. 9, 2021.

(51) Int. Cl.
*G06T 13/40* (2011.01)
*G06F 18/214* (2023.01)
(Continued)

(52) U.S. Cl.
CPC ............ *G06T 13/40* (2013.01); *G06F 18/214* (2023.01); *G06V 10/82* (2022.01); *G06V 40/174* (2022.01)

(58) Field of Classification Search
None
See application file for complete search history.

(56) References Cited

U.S. PATENT DOCUMENTS 10,552,667 B1 * 2/2020 Bogan, III ........... G06V 40/171
10,552,977 B1 * 2/2020 Theis ........................ G06T 7/70
(Continued)

FOREIGN PATENT DOCUMENTS

CN    106447785 A    2/2017
CN    110969572 A    4/2020
(Continued)

OTHER PUBLICATIONS

Korshunova et al., "Fast Face-swap Using Convolutional Neural Networks" (Year: 2017).*
(Continued)

*Primary Examiner* — Hilina K Demeter
(74) *Attorney, Agent, or Firm* — Muncy, Geissler, Olds & Lowe, P.C.

(57) ABSTRACT

An animation generation method for tracking a facial expression and a neural network training method thereof are provided. The animation generation method for tracking a facial expression includes: driving a first role model according to an expression parameter set to obtain a virtual expression image corresponding to the expression parameter set; applying a plurality of real facial images to the virtual expression image corresponding to the facial expression respectively to generate a plurality of real expression images; training a tracking neural network according to the expression parameter set and the real expression images; inputting a target facial image to the trained tracking neural network to obtain a predicted expression parameter set; and using the predicted expression parameter set to control a second role model.

9 Claims, 6 Drawing Sheets

(51) Int. Cl.
  *G06V 10/82* (2022.01)
  *G06V 40/16* (2022.01)

(56) References Cited

U.S. PATENT DOCUMENTS

| | | | | |
|---|---|---|---|---|
| 10,803,646 | B1* | 10/2020 | Bogan, III | G06V 10/82 |
| 11,010,600 | B2* | 5/2021 | Qing | G06N 3/044 |
| 2019/0019063 | A1* | 1/2019 | Prokopenya | G06N 3/047 |
| 2020/0210770 | A1* | 7/2020 | Bala | G06V 10/945 |
| 2021/0056348 | A1* | 2/2021 | Berlin | G06T 11/60 |
| 2022/0027602 | A1* | 1/2022 | Zhou | G06N 3/08 |

FOREIGN PATENT DOCUMENTS

| | | |
|---|---|---|
| CN | 111583105 A | 8/2020 |
| CN | 111598977 A | 8/2020 |
| CN | 111739155 A | 10/2020 |
| TW | 201352003 A | 12/2013 |

OTHER PUBLICATIONS

Li et al. "Facial Expression Recognition with Convolutional Neural Networks via a New Face Cropping and Rotation Strategy" (Year: 2019).*

Korshunoya et al., "Fast Face-swap Using Convolutional Neural Networks" (Year: 2017).*

Yi et al., "Animating Through Warping: An Efficient Method for High-Quality Facial Expression Animation" (Year: 2020).*

* cited by examiner

ANIMATION GENERATION METHOD FOR TRACKING FACIAL EXPRESSION AND NEURAL NETWORK TRAINING METHOD THEREOF

CROSS-REFERENCE TO RELATED APPLICATION

This application claims the benefit of U.S. provisional application Ser. No. 63/158,384, filed on Mar. 9, 2021, the entire contents of which are hereby incorporated by reference.

BACKGROUND

Technical Field

The present disclosure relates to an animation generation method, and in particular, to an animation generation method for tracking a facial expression and a neural network training method thereof.

Related Art

At present, in order to create an animation presenting an expression similar to that of a user, an animator needs to adjust expression control parameters of a role model with reference to facial images of the user, and then apply the adjusted expression control parameters to the role model. This method is not only time-consuming and labor-intensive, but also difficult to obtain an expected expression through adjustment. Consequently, the created animation expression is not as vivid and as natural as the expression of the user.

SUMMARY

In view of this, an embodiment of the present disclosure provides an animation generation method for tracking a facial expression, including: driving a first role model according to an expression parameter set to obtain a virtual expression image corresponding to the expression parameter set, the virtual expression image presenting a facial expression of a virtual role; applying a plurality of real facial images to the virtual expression image corresponding to the facial expression respectively to generate a plurality of real expression images; training a tracking neural network according to the expression parameter set and the real expression images; inputting a target facial image to the trained tracking neural network to obtain a predicted expression parameter set; and using the predicted expression parameter set to control a second role model.

An embodiment of the present disclosure further provides a neural network training method, including: driving a role model according to an expression parameter set to obtain a virtual expression image corresponding to the expression parameter set, the virtual expression image presenting a facial expression of a virtual role; applying a plurality of real facial images to the virtual expression image corresponding to the facial expression respectively to generate a plurality of real expression images; and training a neural network according to the expression parameter set and the real expression images.

An embodiment of the present disclosure further provides an animation generation method for tracking a facial expression, including: driving a first role model according to a plurality of expression parameter sets to obtain a plurality of first virtual expression images corresponding to the expression parameter sets, the first virtual expression images presenting different facial expressions of a virtual role; training a tracking neural network according to the expression parameter sets and the first virtual expression images; applying a virtual facial image to a target facial image to generate a second virtual expression image; inputting the second virtual expression image to the trained tracking neural network to obtain a predicted expression parameter set; and using the predicted expression parameter set to control a second role model.

According to the neural network training method according to the embodiments of the present disclosure, a large number of training samples can be conveniently produced. According to the animation generation method for tracking a facial expression according to the embodiments of the present disclosure, a corresponding expression parameter set can be predicted directly through the facial image, so that expressions shown by the second role model are rich and natural, and there is no need to set and repeatedly adjust parameters in the parameter set.

DETAILED DESCRIPTION

Some embodiments of the present disclosure provide an animation generation method for tracking a facial expression, a neural network training method, and computer equipment and a computer-readable recording medium. The computer equipment includes one or more processors, and one or more non-volatile memories. The one or more non-volatile memories store at least one instruction. The at least one instruction is loaded and executed by the one or more processors, to implement the animation generation method for tracking a facial expression or the neural network training method. The processor may be a processing unit such as a central processing unit (CPU), a graphics processing unit (GPU), a neural network processor (NPU), a digital signal processor (DSP) chip, a microprocessor unit (MCU), or a field-programmable gate array (FPGA). The computer-readable recording medium is a non-transitory storage medium, such as a flash memory, a hard disk, or an optical disc, to store the at least one instruction.

In some embodiments, the computer equipment is configured by a single computing device. In other embodiments, the computer equipment is configured by a plurality of computing devices, the computing devices communicating with each other via a network. The computing device may be a mobile computing device (e.g., a mobile phone or a tablet computer), a computer (e.g., a personal computer or a notebook computer), a server, or the like. It can be understood that, although not specifically mentioned above, the computer equipment may further include other hardware components (if necessary) such as a network module, an audio circuit, a display screen, a photographic device, or a power supply, to provide other functions.

Figure 1:
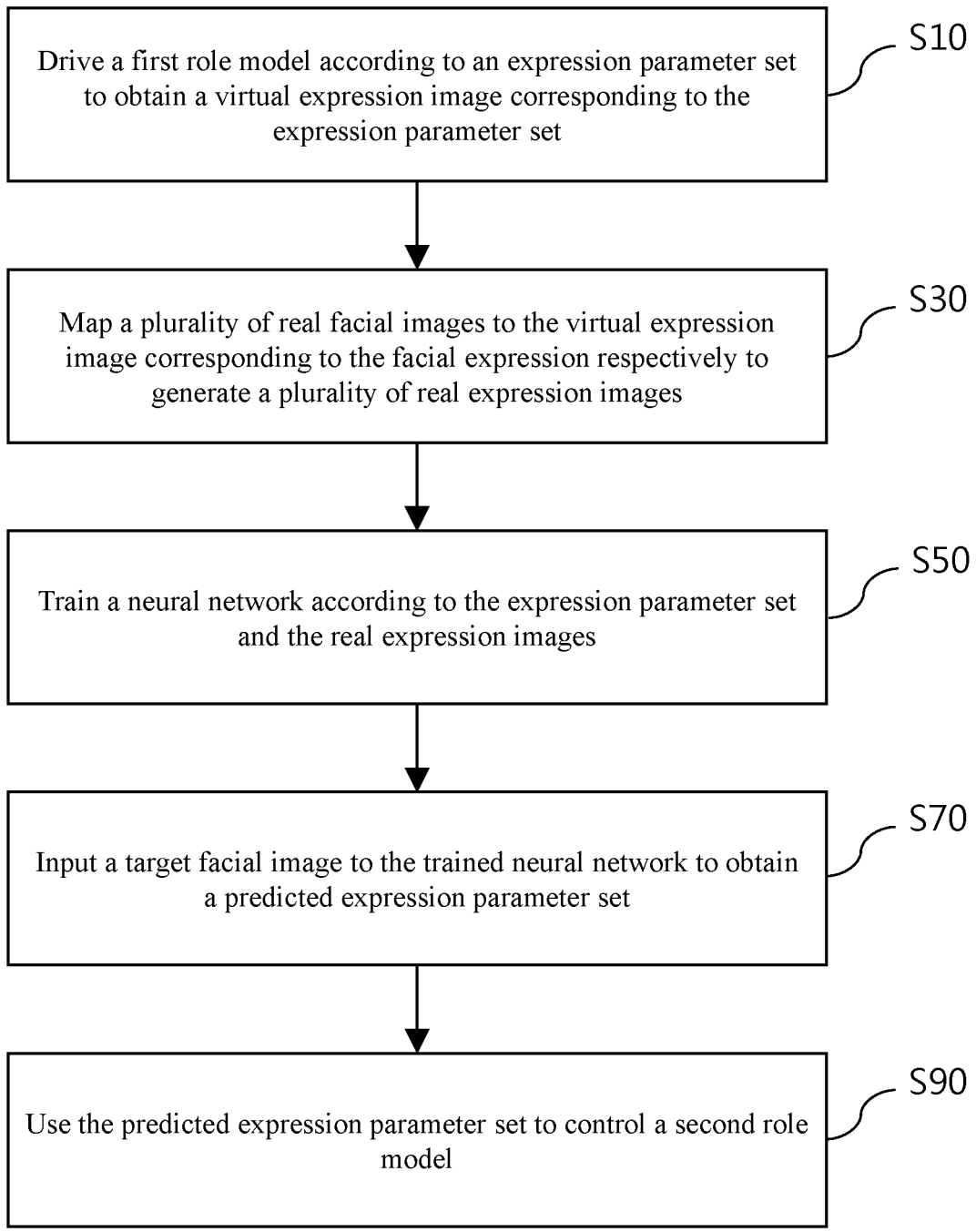
FIG. 1 is a flowchart of an animation generation method for tracking a facial expression according to a first embodiment of the present disclosure.
Figure 2:
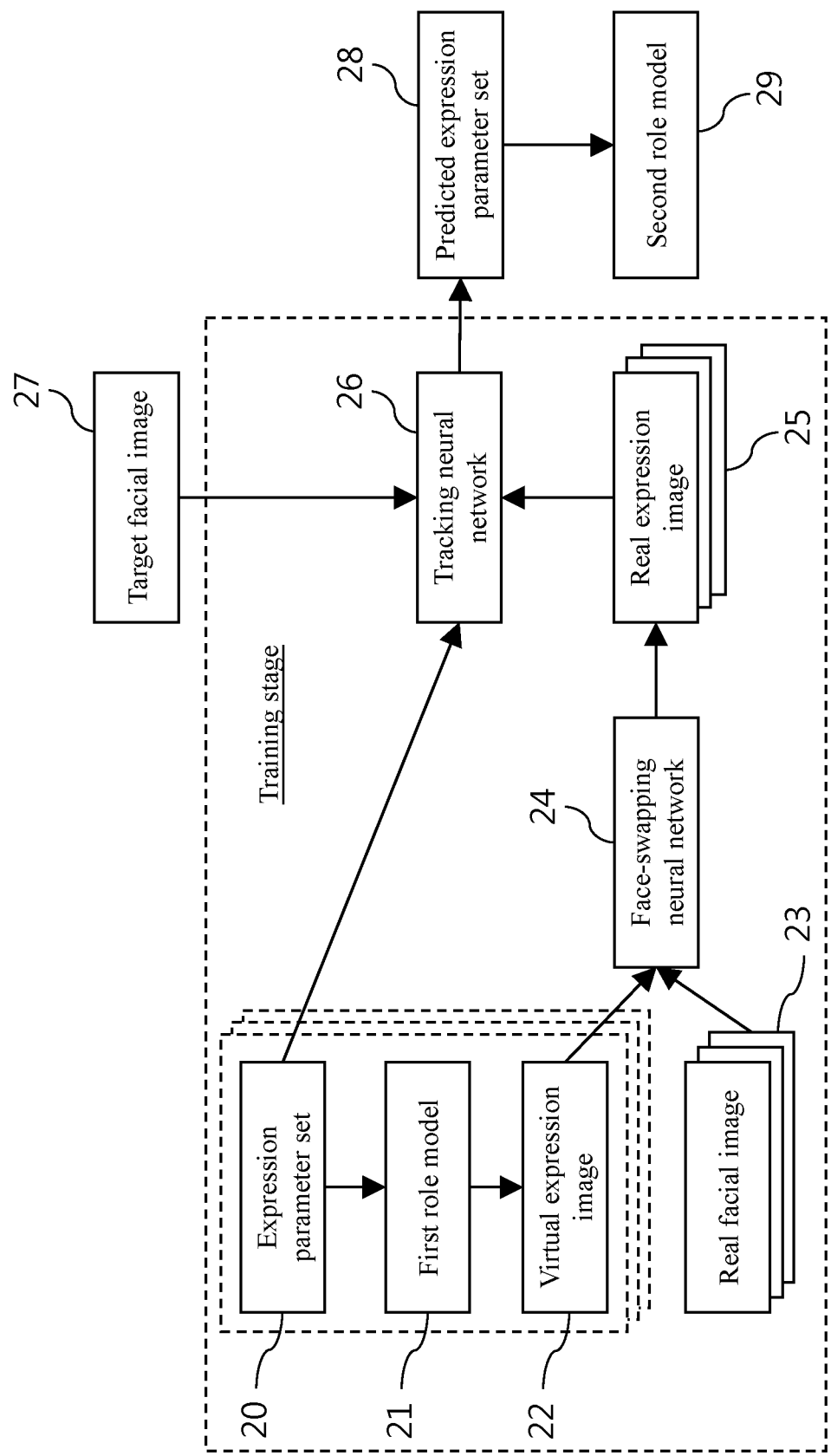
FIG. 2 is a schematic diagram of a software architecture according to the first embodiment of the present disclosure.

Refer to FIG. 1 and FIG. 2 together. FIG. 1 is a flowchart of an animation generation method for tracking a facial expression according to a first embodiment of the present disclosure. FIG. 2 is a schematic diagram of a software architecture according to the first embodiment of the present disclosure. First, according to an expression parameter set 20, a first role model 21 is driven using a game engine (or referred to as a 3D engine), and is rendered to obtain a virtual expression image 22 corresponding to the expression parameter set 20 (step S10). The first role model 21 is a three-dimensional model. The expression parameter set 20 may include, for example, but not limited to, blendshapes, facial landmarks, action units, mesh PCA. The virtual expression image 22 presents a facial expression of a virtual role (e.g., opening mouth or blinking).

Next, a plurality of real facial images 23 are applied to the virtual expression image 22 corresponding to the facial expression respectively to generate a plurality of real expression images 25 (step S30). The real expression image 25 has the same facial expression as the virtual expression image 22. The applying (or referred to as mapping) refers to giving two parameter spaces (hereinafter referred to as a first space and a second space, the two spaces are two-dimensional spaces) that respectively relate to the real facial image 23 and the virtual expression image 22, so that for each point in the first space, a corresponding point can be found in the second space. Specifically, the applying may be implemented using a face-swapping neural network 24, such as FSNet, FSGAN, FaceShifter, or FaceController. The face-swapping neural network 24 includes an autoencoder and a generator. The autoencoder includes an encoder and a decoder. The encoder is used for encoding and compressing an inputted image to obtain a hidden layer. Then, the decoder decodes the hidden layer to restore the inputted image. Herein, the autoencoder includes: a first autoencoder for receiving the real facial image 23, and a second autoencoder for receiving the virtual expression image 22. The generator is used for synthesizing images. The generator uses hidden layers of the first autoencoder and the second autoencoder to generate the real facial image 23 having the same facial expression as the virtual expression image 22.

Through step S10 and step S30, the real facial image 23 having the facial expression corresponding to the expression parameter set 20 can be obtained. Particularly, in step S30, the real facial images 23 corresponding to different real people are respectively applied, and a large number of real facial images 23 having a same expression and different faces can be obtained. In this way, a large number of samples for training a tracking neural network 26 can be conveniently produced.

In some embodiments, step S10 and step S30 are repeatedly performed, and different expression parameter sets 20 are used for each performance, to obtain corresponding real facial images 23 having different facial expressions.

In step S50, a neural network (here, the tracking neural network 26) is trained according to the expression parameter set 20 and the real expression images 25. The tracking neural network 26 may be a convolutional neural network (CNN). The real expression image 25 is inputted to the tracking neural network 26, and the expression parameter set 20 is used as a label of the real expression image 25. In this way, the tracking neural network 26 trained through step S50 can predict a corresponding expression parameter set (hereinafter referred to as a predicted expression parameter set 28) according to the real expression image 25. The foregoing step S10 to step S50 are a neural network training method according to an embodiment of the present disclosure. In some embodiments, the trained neural network may alternatively be used for other applications, not limited to the foregoing predicted expression parameter set 28.

In some embodiments, before the real expression image 25 is inputted to the tracking neural network 26, preprocessing such as cropping, scaling, filtering, and enhancement may be performed on the real expression image 25.

In step S70, a target facial image 27 is inputted to the trained tracking neural network 26 to obtain a predicted expression parameter set 28. The target facial image 27 is an image of a tracked object, for example, an image of a user captured by a photographic device.

In step S90, the predicted expression parameter set 28 is used to control a second role model 29 (e.g., a cartoon character or a celebrity), so that the second role model 29 can present an expression similar to that of the target facial image 27. The second role model 29 is a three-dimensional model.

Figure 3:
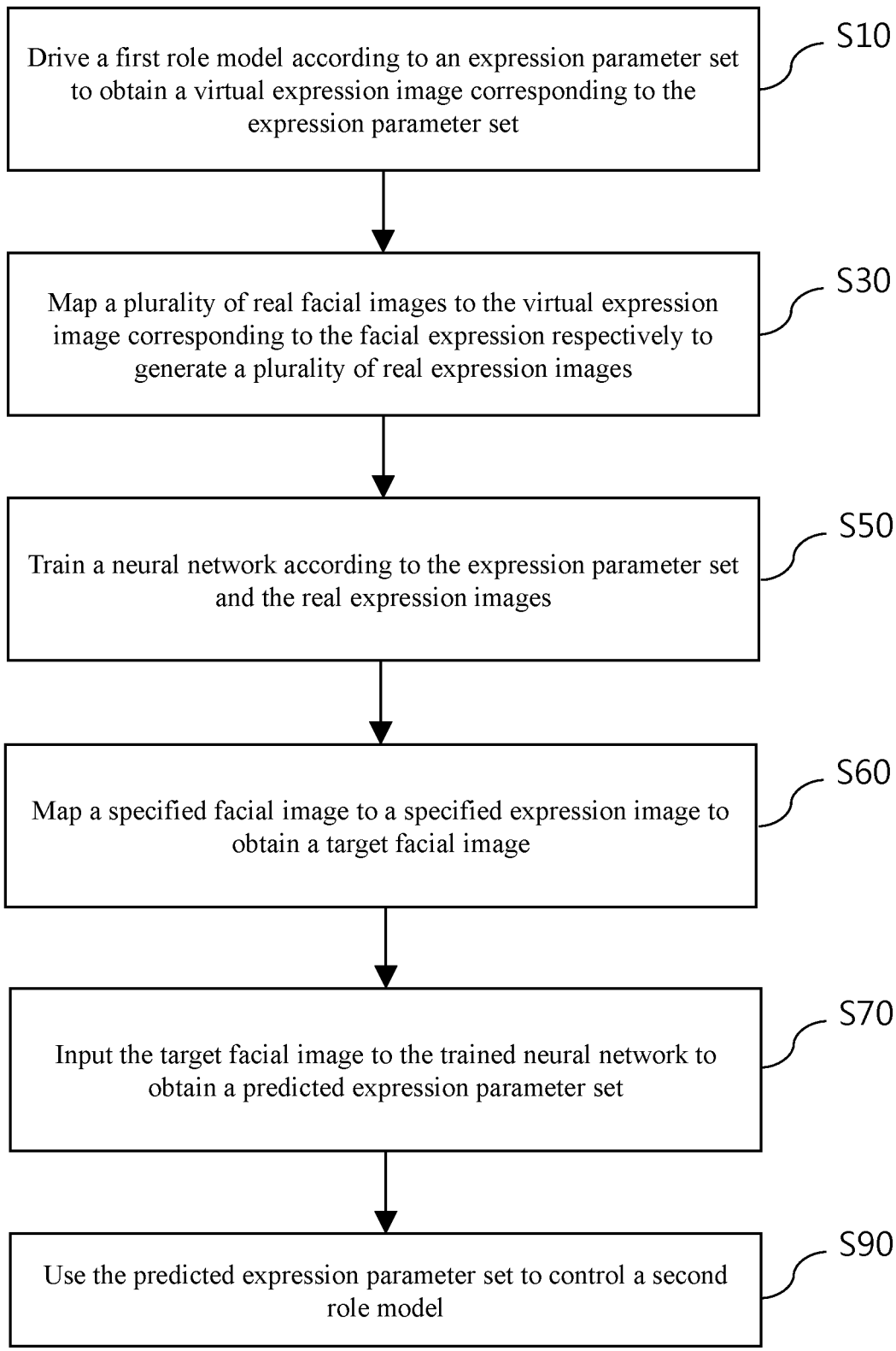
FIG. 3 is a flowchart of an animation generation method for tracking a facial expression according to a second embodiment of the present disclosure.
Figure 4:
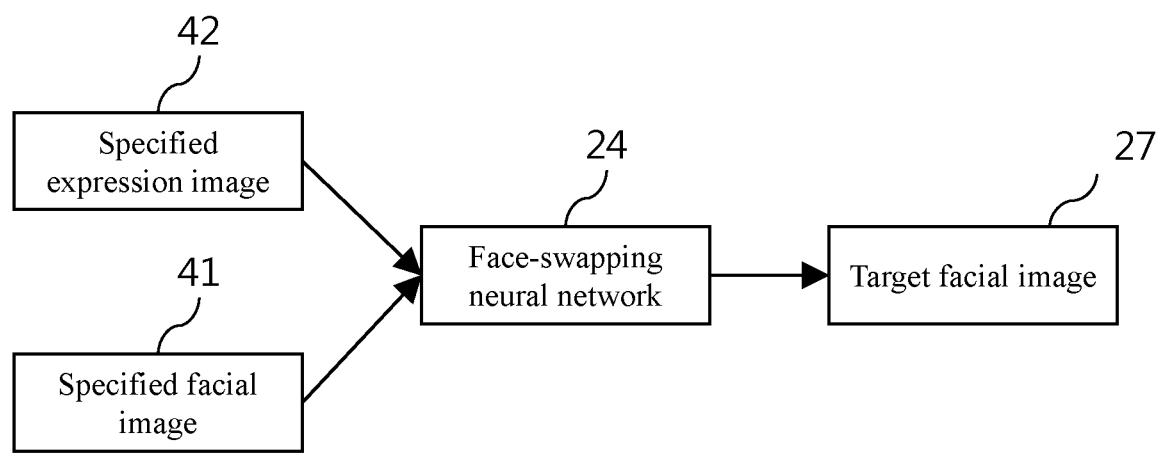
FIG. 4 is a schematic diagram of part of a software architecture according to the second embodiment of the present disclosure.

Refer to FIG. 3 and FIG. 4 together. FIG. 3 is a flowchart of an animation generation method for tracking a facial expression according to a second embodiment of the present disclosure. FIG. 4 is a schematic diagram of part of a software architecture according to the second embodiment of the present disclosure. The difference from the first embodiment is that before step S70, step S60 is further included: applying a specified facial image 41 to a specified expression image 42, to obtain a target facial image 27 used for performing step S70. Specifically, the applying is implemented using the face-swapping neural network 24 in the foregoing step S10, and the specified facial image 41 and the specified expression image 42 are inputted to the face-swapping neural network 24. The specified facial image 41 and the specified expression image 42 are real images of a same person. For example, the specified expression image 42 is a current image of a user captured by a photographic device, and the specified facial image 41 is another image of the user (for example, a pre-stored photo or an image of the user previously captured by the photographic device). Although the output of the face-swapping neural network 24 is still a facial image of the same user, the image converted by the face-swapping neural network 24 may be closer to the training sample type, so that the predicted expression parameter set 28 obtained by performing step S70 subsequently can be more accurate.

Figure 5:
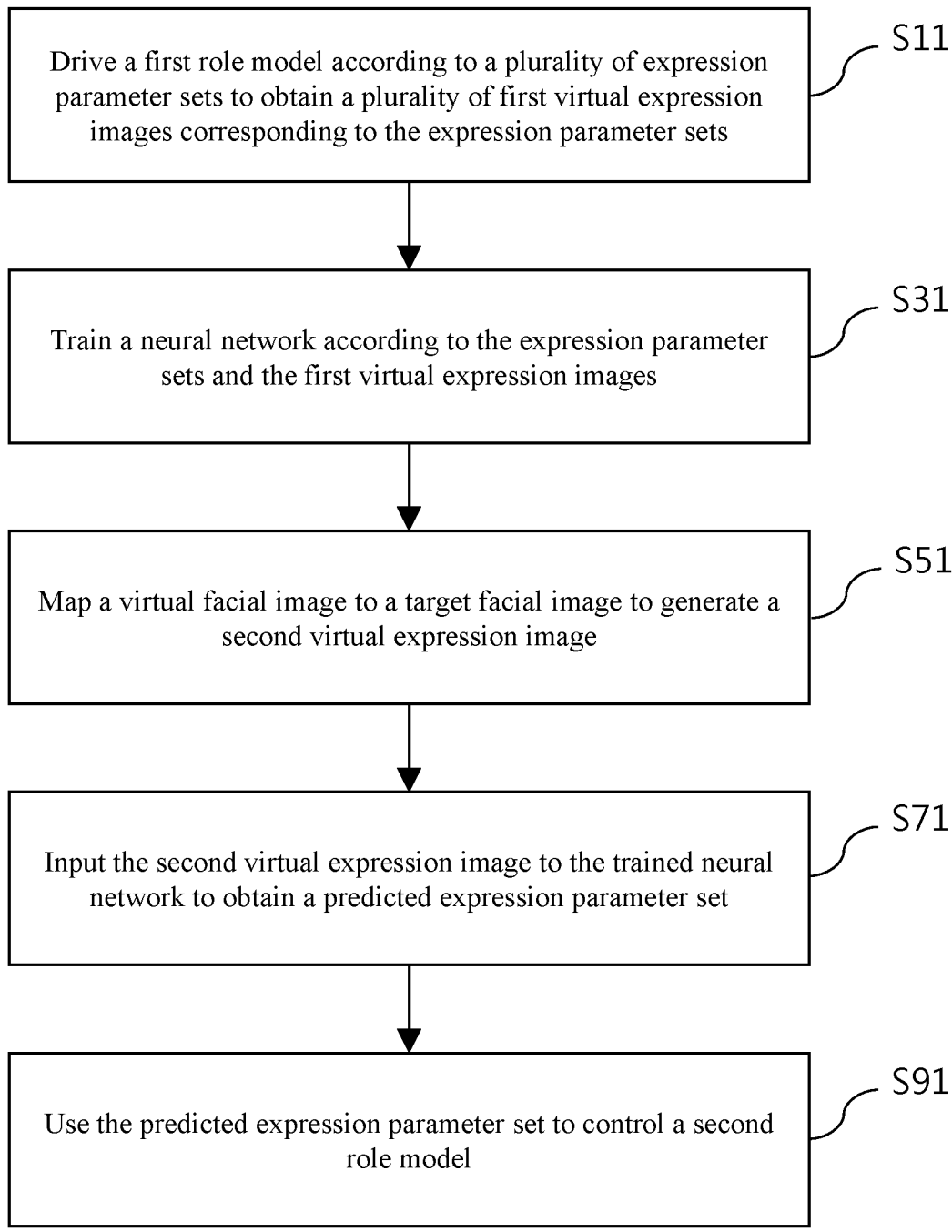
FIG. 5 is a flowchart of an animation generation method for tracking a facial expression according to a third embodiment of the present disclosure.
Figure 6:
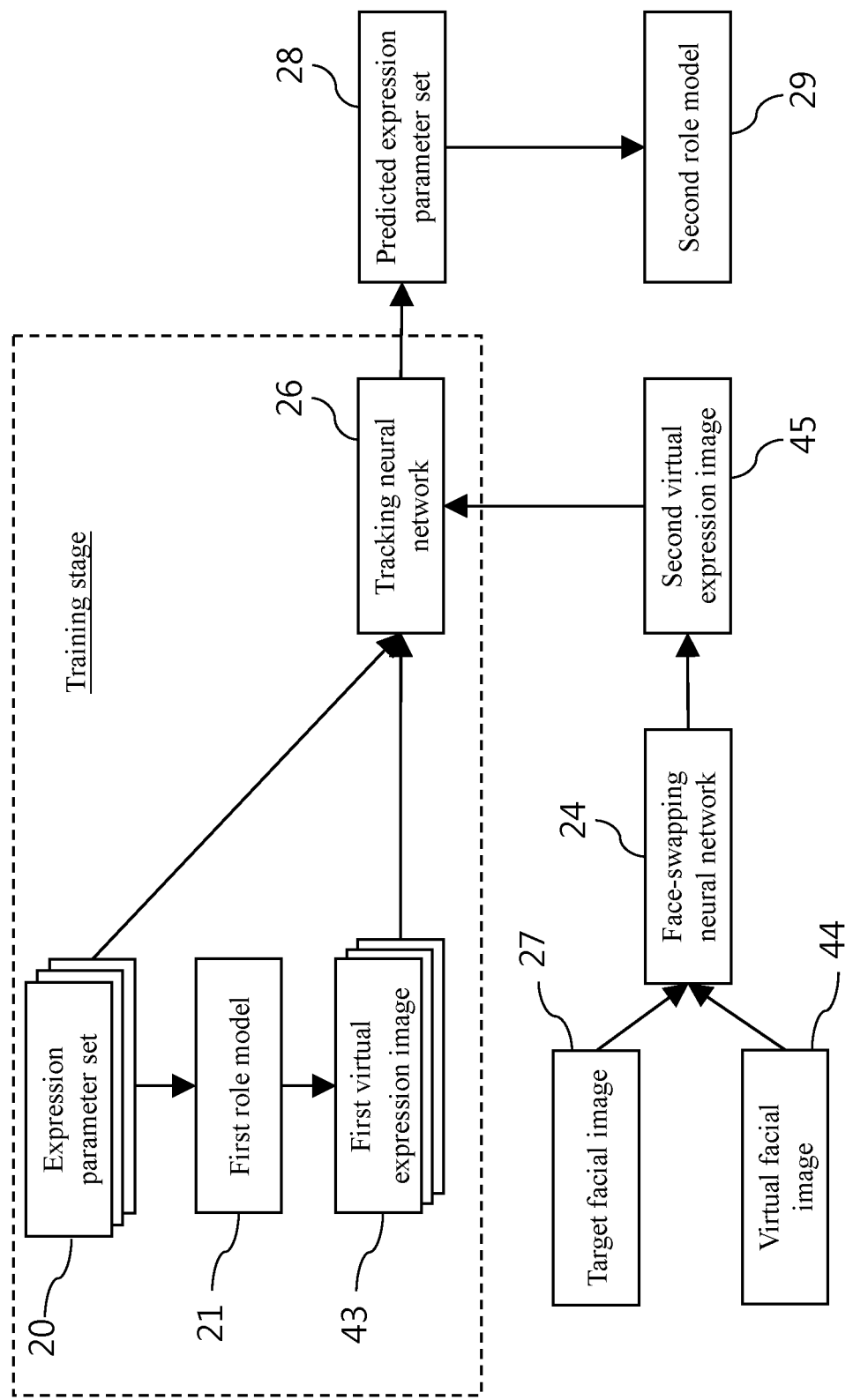
FIG. 6 is a schematic diagram of part of a software architecture according to the third embodiment of the present disclosure.

Refer to FIG. 5 and FIG. 6 together. FIG. 5 is a flowchart of an animation generation method for tracking a facial expression according to a third embodiment of the present disclosure. FIG. 6 is a schematic diagram of part of a software architecture according to the third embodiment of the present disclosure. First, as in the foregoing first embodiment, according to a plurality of expression parameter sets 20, a first role model 21 is driven using a game engine (or referred to as a 3D engine), and is rendered to obtain a plurality of first virtual expression images 43 corresponding to the expression parameter sets 20 (step S11). The first virtual expression images 43 present different facial expressions of a same virtual role.

Next, a neural network (here, the tracking neural network 26) is trained according to the expression parameter sets 20 and the first virtual expression images 43 (step S31). Herein, the configuration of the tracking neural network 26 is similar to that described in the first embodiment, and the details are not repeated here. Here, it should be noted that the input of the tracking neural network 26 in this embodiment is different from that in step S50 in the first embodiment. In this embodiment, the first virtual expression image 43 is inputted to the tracking neural network 26, and the expression parameter set 20 is used as a label of the first virtual expression image 43. The foregoing step S11 to step S31 are a neural network training method according to another embodiment of the present disclosure. In this way, the tracking neural network 26 trained through step S31 can obtain the corresponding predicted expression parameter set 28 according to the inputted virtual expression image. In some embodiments, the trained neural network may alternatively be used for other applications, not limited to the foregoing predicted expression parameter set 28.

In step S51, a virtual facial image 44 is applied to a target facial image 27 to generate a second virtual expression image 45. The virtual facial image 44 is a facial image of the foregoing first role model 21. The target facial image 27 is an image of a tracked object as described above, for example, an image of a user captured by a photographic device. The applying is the same as that in the above descriptions, and may be implemented using the face-swapping neural network 24, and details are not repeated here. The difference from the foregoing embodiments is that in this embodiment, the virtual facial image 44 is applied to the target facial image 27. That is, the second virtual expression image 45 generated through step S51 is a facial image of the first role model 21 having the same facial expression as the target facial image 27.

In step S71, the second virtual expression image 45 is inputted to the trained tracking neural network 26 to obtain a predicted expression parameter set 28.

In step S91, the predicted expression parameter set 28 is used to control a second role model 29 (e.g., a cartoon character or a celebrity), so that the second role model 29 can present an expression similar to that of the target facial image 27. The second role model 29 is a three-dimensional model.

In the third embodiment, the target facial image 27 is converted into the facial image of the first role model 21. Therefore, regardless of who the user of the target facial image 27 is, the tracking neural network 26 outputs the predicted expression parameter set 28 according to the facial image of the same first role model 21. In this way, stable prediction results can be obtained.

In some embodiments, the first role model 21 and the second role model 29 are the same as each other.

In some embodiments, the first role model 21 and the second role model 29 are different from each other.

In some embodiments, a plurality of first role models 21 may be used to obtain a plurality of virtual expression images 22 representing facial expressions of different virtual roles, and a plurality of real facial images 23 are respectively applied to the virtual expression images 22, to train the tracking neural network 26.

In some embodiments, the predicted expression parameter set 28 obtained using the trained tracking neural network 26 may be used for controlling a plurality of second role models 29.

According to the neural network training method according to the embodiments of the present disclosure, a large number of training samples can be conveniently produced. According to the animation generation method for tracking a facial expression according to the embodiments of the present disclosure, a corresponding expression parameter set can be predicted directly through the facial image without the limitation of a preset expression parameter set, so that expressions shown by the second role model are rich and natural.

What is claimed is:

1. An animation generation method for tracking a facial expression, comprising: applying an expression parameter set to a first 3D role model, by a 3D engine, so that the first 3D role model presents a facial expression corresponding to an expression parameter set;
   rendering the first 3D role model to obtain a virtual expression image corresponding to the expression parameter set, the virtual expression image presenting the facial expression of the first 3D role model;
   applying a plurality of real facial images to the virtual expression image corresponding to the facial expression respectively to generate a plurality of real expression images having the same facial expression as the virtual expression image;
   training a tracking neural network according to the expression parameter set, which corresponds to the facial expression of the first 3D role model, and the real expression images having the same facial expression as the virtual expression image;
   inputting a target facial image to the trained tracking neural network to obtain a predicted expression parameter set; and
   applying the predicted expression parameter set to a second 3D role model, by the 3D engine, so that the second 3D role model presents an expression similar to the target facial image.

2. The animation generation method for tracking a facial expression according to claim 1, wherein the applying the real facial images to the virtual expression image corresponding to the facial expression respectively is implemented by using a face-swapping neural network.

3. The animation generation method for tracking a facial expression according to claim 1, wherein before the inputting the target facial image to the trained tracking neural network, the method further comprises:
   applying a specified facial image to a specified expression image to obtain the target facial image, wherein the specified facial image and the specified expression image are real images of a same person.

4. The animation generation method for tracking a facial expression according to claim 1, wherein training the tracking neural network by inputting the plurality of real expression images to the tracking neural network and labeling the real expression image according to the expression parameter set.

5. A neural network training method, comprising: applying an expression parameter set to a 3D role model, by a 3D engine, so that the 3D role model presents a facial expression corresponding to an expression parameter set;
   rendering the 3D role model to obtain a virtual expression image corresponding to the expression parameter set, the virtual expression image presenting the facial expression of the 3D role model;
   applying a plurality of real facial images to the virtual expression image corresponding to the facial expression respectively to generate a plurality of real expression images having the same facial expression as the virtual expression image;
   training a neural network according to the expression parameter set, which corresponds to the facial expression of the 3D role model, and the real expression images having the same facial expression as the virtual expression image, inputting a target facial image to the trained tracking neural network to obtain a predicted expression parameter set; and applying the predicted expression parameter set to another 3D role model, by the 3D engine, so that the another 3D role model presents an expression similar to the target facial image.

6. The neural network training method according to claim 5 wherein the applying the real facial images to the virtual expression image corresponding to the facial expression respectively is implemented by using a face-swapping neural network.

7. An animation generation method for tracking a facial expression, comprising:

repeatedly applying a plurality of expression parameter sets to a first 3D role model and rendering the first 3D role model to which different expression parameter sets are applied, by a 3D engine, to obtain a plurality of first virtual expression images presenting different facial expressions of the first 3D role model;

training a tracking neural network according to the expression parameter sets, which respectively corresponds to different facial expressions of the first 3D role model, and the corresponding first virtual expression images presenting different facial expressions of the first 3D role model;

applying a virtual facial image of the first 3D role model to a target facial image of a tracked object to generate a second virtual expression image presenting the first 3D role model having the same facial expression as the target facial image;

inputting the second virtual expression image to the trained tracking neural network to obtain a predicted expression parameter set; and applying the predicted expression parameter set to a second 3D role model, by the 3D engine, so that the second 3D role model presents an expression similar to the second virtual expression image.

8. The animation generation method for tracking a facial expression according to claim 6, wherein the applying the virtual facial image to the target facial image is implemented by using a face-swapping algorithm.

9. The animation generation method for tracking a facial expression according to claim 7, wherein training the tracking neural network by inputting the plurality of real expression images to the tracking neural network and labeling the real expression image according to the expression parameter set.

* * * * *